(12) United States Patent
Ammari et al.

(10) Patent No.: US 9,658,406 B2
(45) Date of Patent: May 23, 2017

(54) ALIGNING A FIBER IN AN OPTICAL FIBER CONNECTOR

(71) Applicant: Novartis AG, Basel (CH)

(72) Inventors: Eyad Ammari, Irvine, CA (US); Chenguang Diao, Irvine, CA (US)

(73) Assignee: Novartis AG, Basel (CH)

( * ) Notice: Subject to any disclaimer, the term of this patent is extended or adjusted under 35 U.S.C. 154(b) by 323 days.

(21) Appl. No.: 14/313,194

(22) Filed: Jun. 24, 2014

(65) Prior Publication Data
US 2015/0370018 A1  Dec. 24, 2015

(51) Int. Cl.
| | |
|---|---|
| *B29C 65/00* | (2006.01) |
| *B29C 65/02* | (2006.01) |
| *B32B 37/00* | (2006.01) |
| *B32B 38/00* | (2006.01) |
| *B32B 38/10* | (2006.01) |
| *B65C 9/25* | (2006.01) |

(Continued)

(52) U.S. Cl.
CPC .......... *G02B 6/3843* (2013.01); *G02B 6/385* (2013.01); *B29C 65/48* (2013.01); *B29C 65/565* (2013.01); *G02B 6/107* (2013.01); *G02B 6/3851* (2013.01); *Y10T 29/49773* (2015.01); *Y10T 29/49828* (2015.01)

(58) Field of Classification Search
CPC ...... G02B 6/38; G02B 6/3833; G02B 6/3834; G02B 6/3843; G02B 6/3855; G02B 6/3861; G02B 6/3873; G02B 6/3885; Y10T 156/10; Y10T 29/49865; B29C 65/48; B29C 65/565

USPC ... 156/60, 64, 153, 154, 166, 293, 294, 296, 156/303.1, 322; 385/134, 136, 137, 138, 385/60, 62, 66, 67, 76, 77, 78, 80, 81, 84, 385/85

See application file for complete search history.

(56) References Cited

U.S. PATENT DOCUMENTS

| | | | | |
|---|---|---|---|---|
| 4,116,655 | A | * | 9/1978 | Lewis ..................... C03B 37/15 156/180 |
| 6,011,616 | A | * | 1/2000 | Volcy ................... G01B 11/272 356/73.1 |

(Continued)

OTHER PUBLICATIONS

Specialty Glass Products: "Glass Types & Materials" http://www.sgpinc.com/materials.htm.*

(Continued)

*Primary Examiner* — Philip Tucker
*Assistant Examiner* — Brian R Slawski

(57) ABSTRACT

According to certain embodiments, a method comprises disposing a first nanofiber portion of a nanofiber and a first assisting fiber portion of an assisting fiber into a ferrule of a connector. A second assisting fiber portion is heated. The nanofiber and assisting fiber are moved such that a portion of the heated assisting fiber portion is disposed within the ferrule. According to other embodiments, a method comprises placing a fiber within a ferrule of a connector having a fixed point such that a fiber center is a fiber distance away from a receptacle center. The fiber distance between the fiber center and receptacle center is measured. An angular offset between the fixed point and fiber center is measured about the receptacle center. A rotation angle for the fiber distance and angular offset is determined. The ferrule is rotated relative to the connector according to the rotation angle.

4 Claims, 6 Drawing Sheets

(51) Int. Cl.
    *C09J 5/00*     (2006.01)
    *G02B 6/38*     (2006.01)
    *G02B 6/00*     (2006.01)
    *G02B 6/36*     (2006.01)
    *B29C 65/48*     (2006.01)
    *B29C 65/56*     (2006.01)
    *G02B 6/10*     (2006.01)

(56) References Cited

U.S. PATENT DOCUMENTS 8,561,280 B2     10/2013     Diao et al.
2013/0097843 A1*     4/2013     Diao .................. A61F 9/00821
                                                                         29/447

OTHER PUBLICATIONS

Specialty Glass Products: "BK-7" http://www.sgpinc.com/bk70.htm.*
Saint-Gobain: "Glass properties" http://www.saint-gobain-sekurit.com/glossary/glass-properties.*
Neutrium: "Thermal conductivity of metals and alloys" https://neutrium.net/heat_transfer/thermal-conductivity-of-metals-and-alloys/.*

\* cited by examiner

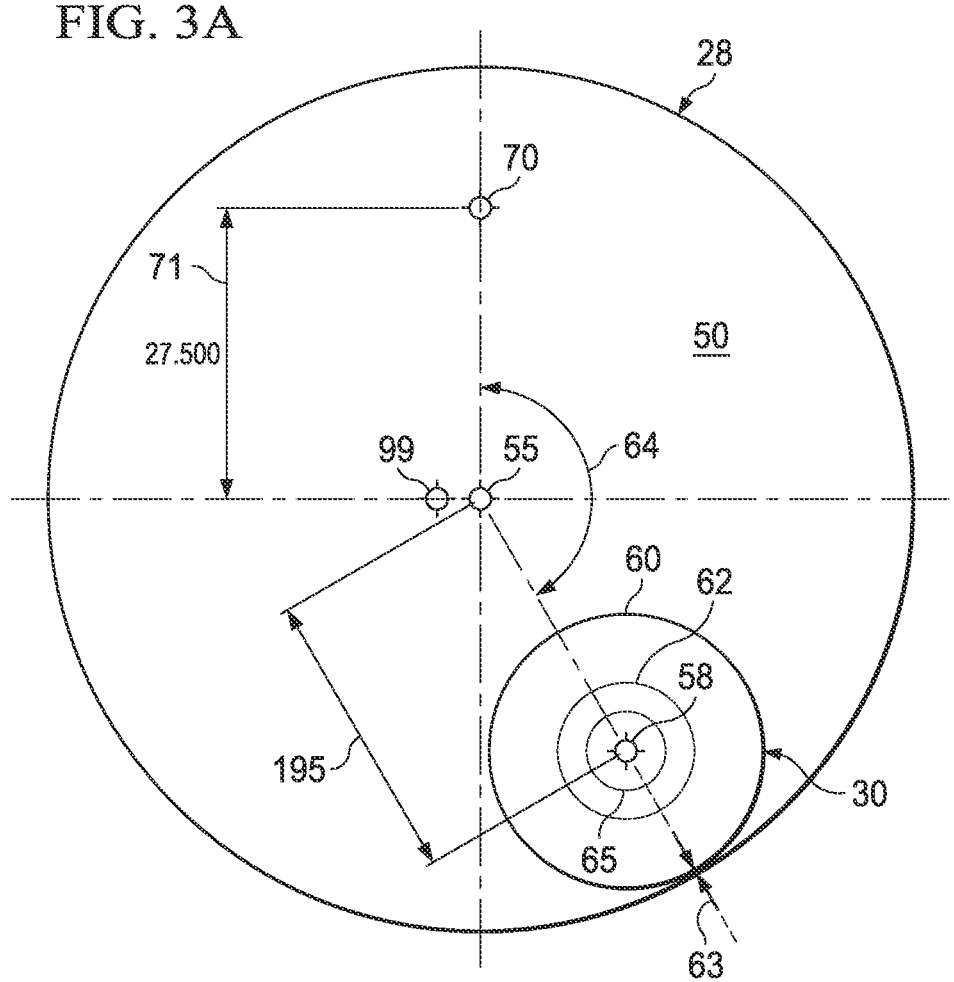
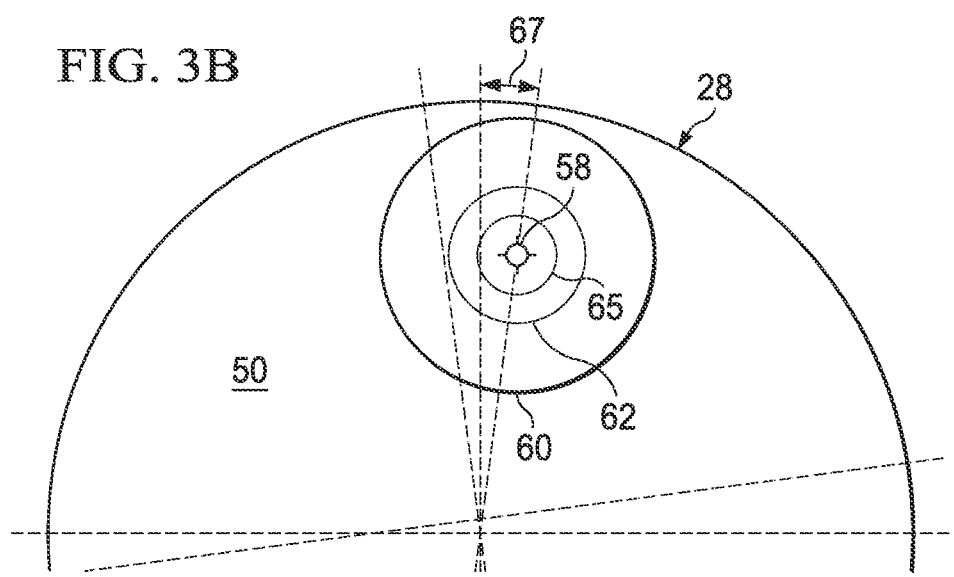

US 9,658,406 B2

ALIGNING A FIBER IN AN OPTICAL FIBER CONNECTOR

TECHNICAL FIELD

The present disclosure relates generally to optical fiber connectors and more particularly to aligning a fiber in an optical fiber connector.

BACKGROUND

An optical fiber is located at the end of an optical fiber connector. The connector may be used to join the optical fiber to an optical fiber of an optical device, such as an illumination system that provides a light beam to the optical fiber. The connector mechanically couples and aligns the cores of fibers so light can pass through with minimum loss.

BRIEF SUMMARY

According to certain embodiments, a method comprises disposing a first nanofiber portion of a nanofiber and a first assisting fiber portion of an assisting fiber into an interior volume of a ferrule of a connector such that a second assisting fiber portion of the assisting fiber is external to the ferrule. At least the second assisting fiber portion is heated to yield a heated assisting fiber portion. The nanofiber and the assisting fiber are moved with respect to the ferrule such that at least a portion of the heated assisting fiber portion is disposed within the interior volume of the ferrule.

According to other embodiments, a method comprises placing a fiber within a ferrule of a connector such that a fiber center of the fiber is a fiber distance away from a center of the receptacle. The connector has a fixed point. The fiber distance between the fiber center and the center of the receptacle is measured. An angular offset between the fixed point and the fiber center is measured about the center of the receptacle. A rotation angle for the fiber distance and the angular offset is determined from an angular correction table. The ferrule is rotated relative to the connector according to the rotation angle to align a launch diameter with the fixed point.

According to yet other embodiments, a method comprises placing a fiber within a ferrule of a connector such that a fiber center of the fiber is a fiber distance away from a center of the receptacle. The fiber is placed within the ferrule by disposing the fiber and an assisting fiber into an interior volume of the ferrule and moving the fiber and the assisting fiber with respect to the ferrule. The connector has a fixed point indicated by an alignment key. The fiber distance between the fiber center and the center of the receptacle is measured. An angular offset between the fixed point and the fiber center is measured about the center of the receptacle. A rotation angle for the fiber distance and the angular offset is determined from an angular correction table. The ferrule is rotated relative to the receptacle according to the rotation angle to align a launch diameter with the fixed point.

BRIEF DESCRIPTION OF THE DRAWINGS

Exemplary embodiments of the present disclosure will now be described by way of example in greater detail with reference to the attached figures, in which:

FIGS. 3A through 4B illustrate an example of a method for aligning (or clocking) a fiber launch diameter of a fiber with respect to an alignment key of a connector.

DESCRIPTION OF EXAMPLE EMBODIMENTS

Figure 1A:
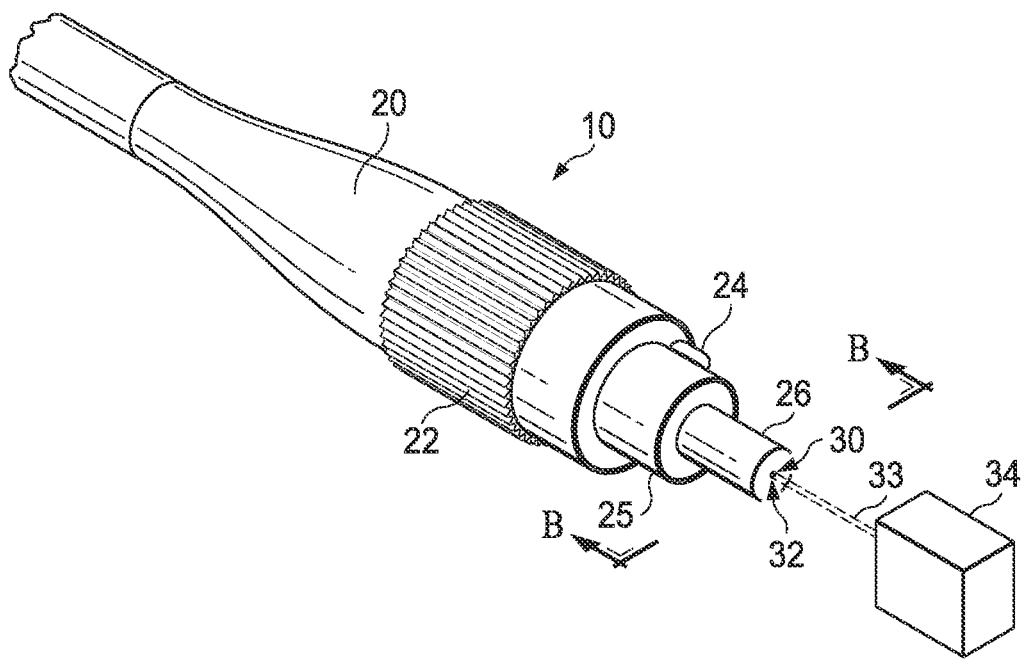
FIGS. 1A and 1B illustrate an example of an optical fiber connector according to certain embodiments.

Referring now to the description and drawings, example embodiments of the disclosed apparatuses, systems, and methods are shown in detail. The description and drawings are not intended to be exhaustive or otherwise limit or restrict the claims to the specific embodiments shown in the drawings and disclosed in the description. Although the drawings represent possible embodiments, the drawings are not necessarily to scale and certain features may be exaggerated, removed, or partially sectioned to better illustrate the embodiments.

Figure 1B:
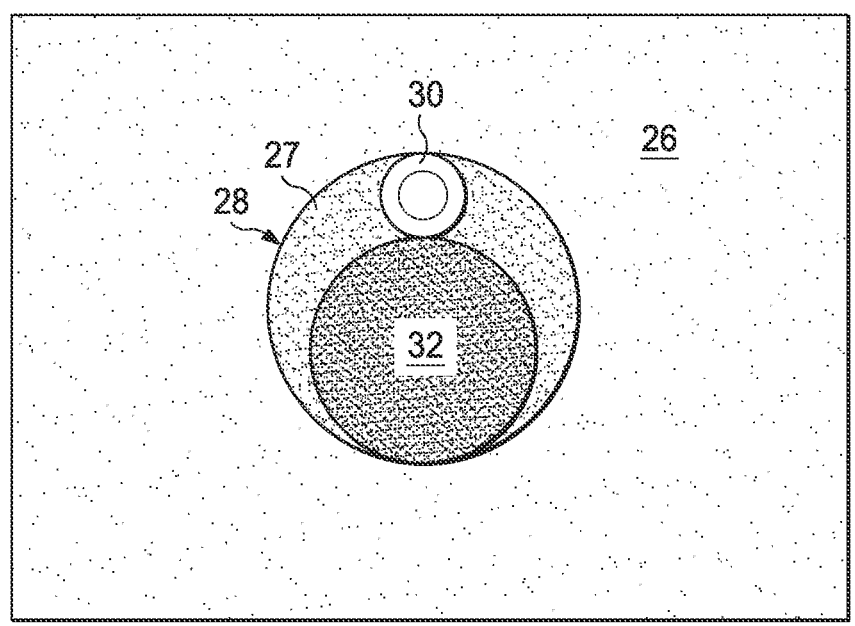

FIGS. 1A and 1B illustrate an example of an optical fiber connector 10 according to certain embodiments. FIG. 1A illustrates a perspective view of connector 10, and FIG. 1B illustrates a cross-sectional view of connector 10. Connector 10 may be used for any suitable application, e.g., to couple a surgical instrument to a light source or to connect a telecom device to another device or a light source.

Using known methods, it can be difficult to align a launch diameter of a fiber of a connector with a fixed point of the connector. Thus, this description presents examples of methods that can be used to align the launch diameter with the fixed point. According to certain embodiments, a method includes disposing a first nanofiber portion of a nanofiber and a first assisting fiber portion of an assisting fiber into a ferrule of a connector. A second assisting fiber portion is heated. The nanofiber and assisting fiber are moved such that a portion of the heated assisting fiber portion is disposed within the ferrule. According to other embodiments, a method comprises placing a fiber within a ferrule of a connector having a fixed point such that a fiber center is a fiber distance away from a receptacle center. The fiber distance between the fiber center and receptacle center is measured. An angular offset between the fixed point and fiber center is measured about the receptacle center. A rotation angle for the fiber distance and angular offset is determined. The ferrule is rotated relative to the connector according to the rotation angle.

In the illustrated example, connector 10 includes a strain relief 20, a coupling 22, an alignment key 24, a cylindrical support 25, a ferrule 26, an optical fiber 30 (e.g., a nanofiber), and an assisting fiber 32 coupled as shown. Connector 10 couples fiber 30 to an illumination system 34 to allow fiber 30 to receive a laser beam 33 from illumination system 34.

Strain relief 20 alleviates force applied to fiber 30. Coupling 22 allows a user to couple fiber 30 to an illumination system. Alignment key 24 indicates the alignment of fiber 30 within connector 10. Alignment key 24 may be placed on a cylindrical support 25, within which ferrule 26 may be disposed. Ferrule 26 supports and holds fiber 30 in place. In certain embodiments, the diameter of fiber 30 may be much smaller than the inner diameter of ferrule 26. Assisting fiber 32 facilitates placement of fiber 30 in a desired position within ferrule 26, e.g., against the inner wall of ferrule 26, during assembly according to the methods described herein. Adhesive 27 holds fiber 30 and assisting fiber 32 in place.

In certain embodiments, connector 10 may have any suitable shape, e.g., a cylindrical shape, and any suitable size, e.g., a length in the range of 1 to 3 centimeters (cm) and an outer diameter in the range of 0.5 to 5.0 cm. Ferrule 26 may have any suitable shape, e.g., a cylindrical shape with a surface that forms an interior volume with an interior diameter. Ferrule 26 may have any suitable size, e.g., a length between 0.5 to 2.0 cm and an inner diameter between 50 to 1000 micrometers (μm), such as 70 to 100 μm, e.g., approximately 80 μm; 100 to 200 μm, e.g., approximately 125 μm; or 200 to 300 μm, e.g., approximately 275 μm. Ferrule 26 may comprise any suitable material, e.g., ceramic or metal In certain embodiments, fiber 30 may be an optical fiber that can transmit light and may comprise any suitable transparent material, e.g., glass or plastic. Fiber 30 may have a transparent core surrounded by a cladding, which may in turn be surrounded by a jacket. Fiber 30 may have any suitable size, for example, a core a diameter in the range of 10 to 100 μm, such as 20 to 40 μm, e.g., approximately 30 to 35 μm, or 40 to 80, e.g., approximately 75 μm. In certain embodiments, fiber 30 may be shaped in any suitable manner at any suitable portion of fiber 30 to affect its light propagation properties.

In certain embodiments, assisting fiber 32 may be any suitable fiber that expands when heated and may comprise any suitable material, e.g., glass or plastic such as PEEK or PTFE. Assisting fiber 32 may have any suitable size. In certain embodiments, the diameters of assisting fiber 32 and fiber 30 may be 40 to 60% of the inner diameter of ferrule 26. For example, the diameter of the assisting fiber 32 may be in the range of 50 to 200 μm, e.g., 70 to 150 μm, such as approximately 100 μm.

Illumination system 34 may be any suitable light source that generates beam 33 and directs beam 33 to a particular point of connector 10. In certain embodiments, illumination system 34 has a receptacle that receives connector 10. The receptacle may be, e.g., a female connector. In certain embodiments, system 34 may be any other suitable light connector designed to have a fiber aligned with the fiber of connector 10.

Figure 2A:
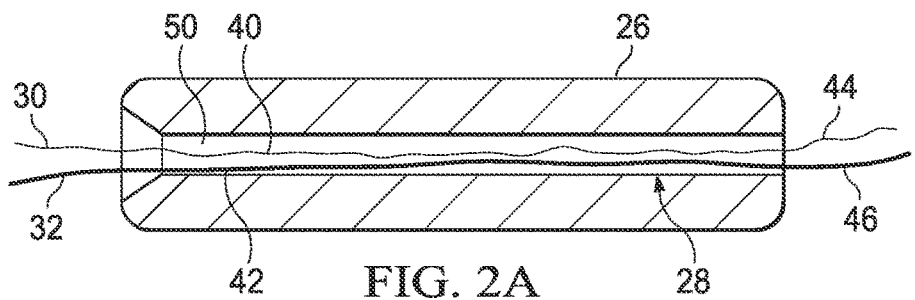
FIGS. 2A through 2E illustrate an example of a method for assembling an optical fiber within a ferrule.

FIGS. 2A through 2E illustrate an example of a method for assembling an optical fiber within a ferrule. FIG. 2A illustrates disposing fibers 30 and 32 within ferrule 26 such that a first portion 40 of fiber 30 and a first portion 42 of assisting fiber 32 are disposed within an interior volume 50 of ferrule 26, and a second portion 44 of fiber 30 and a second portion 46 of assisting fiber 32 are external to ferrule 26. For example, fibers 30 and 32 may be inserted into the back of ferrule 26 until portions 44 and 46 exit the front of ferrule 26 and portions 40 and 42 remain within the ferrule 26. A portion may be any suitable part of a fiber, and different portions of fiber may or may not overlap. In certain embodiments, other portions of fibers 30 and 32, in addition to first portions 40 and 42, respectively, may be inside of ferrule 26. In addition, other portions of fibers 30 and 32, in addition to second portions 44 and 46, respectively, may be external to ferrule 26

Figure 2B:
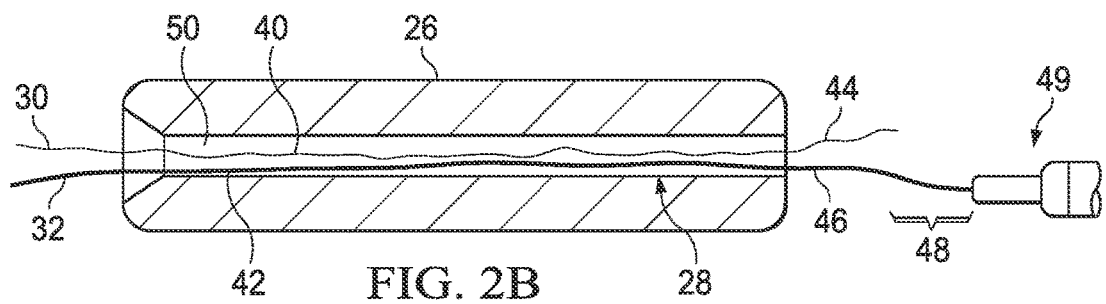

FIG. 2B illustrates heating at least second assisting fiber portion 46 with a heating device 49 to yield a heated assisting fiber portion 48. Portion 46 may be heated to any suitable size. In certain embodiments, portion 46 may be heated such that the diameters of fiber 30 and a portion 48 of assisting fiber 32 combined are larger than the inner diameter wall 28 of ferrule 26. Portion 46 may be heated to any suitable temperature sufficient to cause desired expansion. In certain embodiments, the temperature may be determined using the coefficient of thermal expansion of the material of assisting fiber 32, which measures the fractional change in size per degree change in temperature at a constant pressure. For example, assisting fiber 32 comprising plastic may be heated to a temperature 500 to 1000° Fahrenheit (F), such as 680° F., for 0.5 to 2 minutes. In certain embodiments, portion 48 is heated to expand an end of portion 48 to yield an expanded end.

Figure 2C:
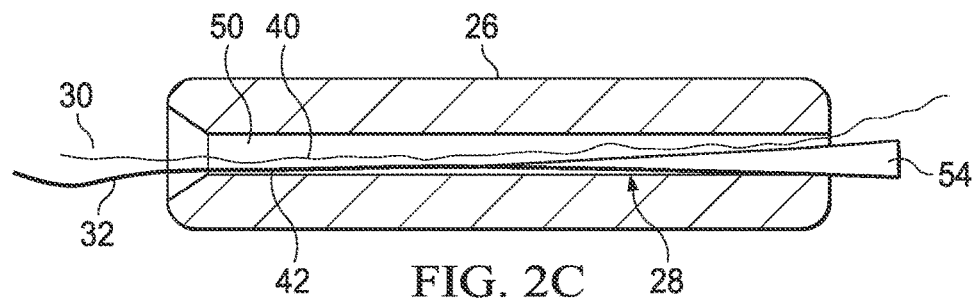

FIG. 2C illustrates moving fiber 30 and assisting fiber 32 with respect to ferrule 26. At least a portion of heated assisting fiber portion 48 is disposed with interior volume 50 of ferrule 26. In certain embodiments, assisting fiber 32 is moved until the expanded end 54 stops assisting fiber 32 from moving into interior volume 50. In these embodiments, the process moves optical fiber 30 towards the inner wall of ferrule 26 and even pushes fiber 30 against the inner wall.

Figure 2D:
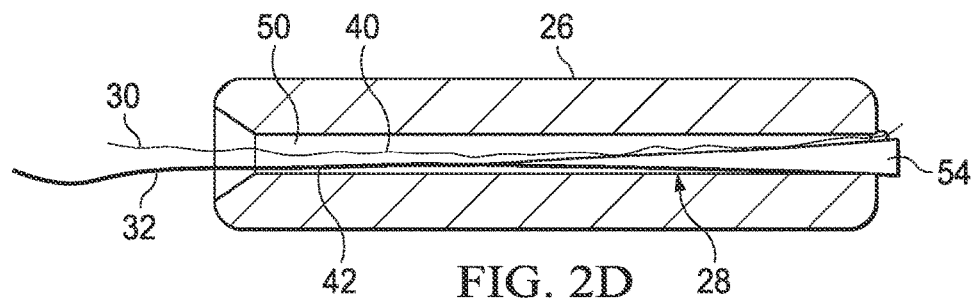
Figure 2E:
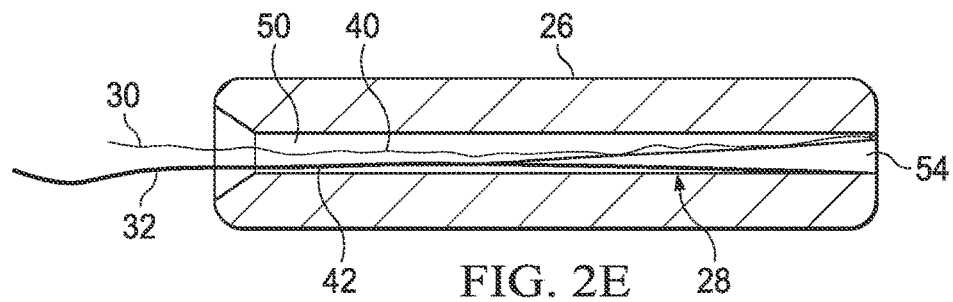

FIG. 2D illustrates bonding fibers 30 and 32 to ferrule 26. Fiber 30 and assisting fiber 32 may be bonded to the ferrule 26 using, e.g., an adhesive. FIG. 2E illustrates polishing ferrule 26 and the ends of fibers 30 and 32. In certain embodiments, fibers 30 and 32 may be cut at the end of ferrule 26. The end of ferrule 26, fiber 30 and assisting fiber 32 may be polished using, e.g., polishing papers. Polishing papers of decreasing granularity may be used, e.g., approximately 3 μm, 1 μm, and 0.3 μm.

FIGS. 3A and 3B illustrate an example of a method for aligning (or clocking) a fiber launch diameter 65 of a fiber 30 with respect to alignment key 24 of connector 10. In this example, the ferrule 26 of connector 10 can be rotated inside an alignment fixture while key 24 and support 29 remain fixed. After alignment, ferrule 26 is adhered permanently to the rest of the connector so as to maintain alignment when moved among systems that are aligned identically. In the illustrated example, fiber 30 has a fiber center 58, a fiber diameter 60, and a fiber core diameter 62. Fiber 30 has an effective cross-section that accepts a sufficient amount of light, where the sufficiency of light may depend on the physical parameters of fiber 30 and the application for which fiber 30 is used. For example, sufficiency may be 70% to 80%, 80% to 90%, or 90% to 100% of the total amount of light. The diameter of this cross-section is the launch diameter 65. Center 55 is the center point of the receptacle of the illumination system. This point is constant and can be measured. It may or may not be at the physical longitudinal axis of ferrule 26 shown as point 99. As an example, center 55 may be on the longitudinal axis of a receptacle of illumination system 34 when the receptacle is connected to connector 10. A key line 67 travels through receptacle center 55 and alignment key 24, e.g., parallel to edge 29 of alignment key 24. A fixed launch point 98 lies on key line 67.

When connector 10 is properly aligned, fiber launch diameter 65 is aligned with fixed launch point 70, which allows a user to properly couple connector 20 to illumination system 34 such that illumination system 34 launches a light beam towards the fiber that intersects launch diameter 65 at least once.

In certain embodiments, the outer diameter of ferrule 26 may be highly concentric (within submicrons) with the inner diameter or eccentric by several microns. If fiber 30 is mounted against the inner wall, the position of fiber center 58 may be accurately determined radially relative to receptacle center 55.

Figure 4A:
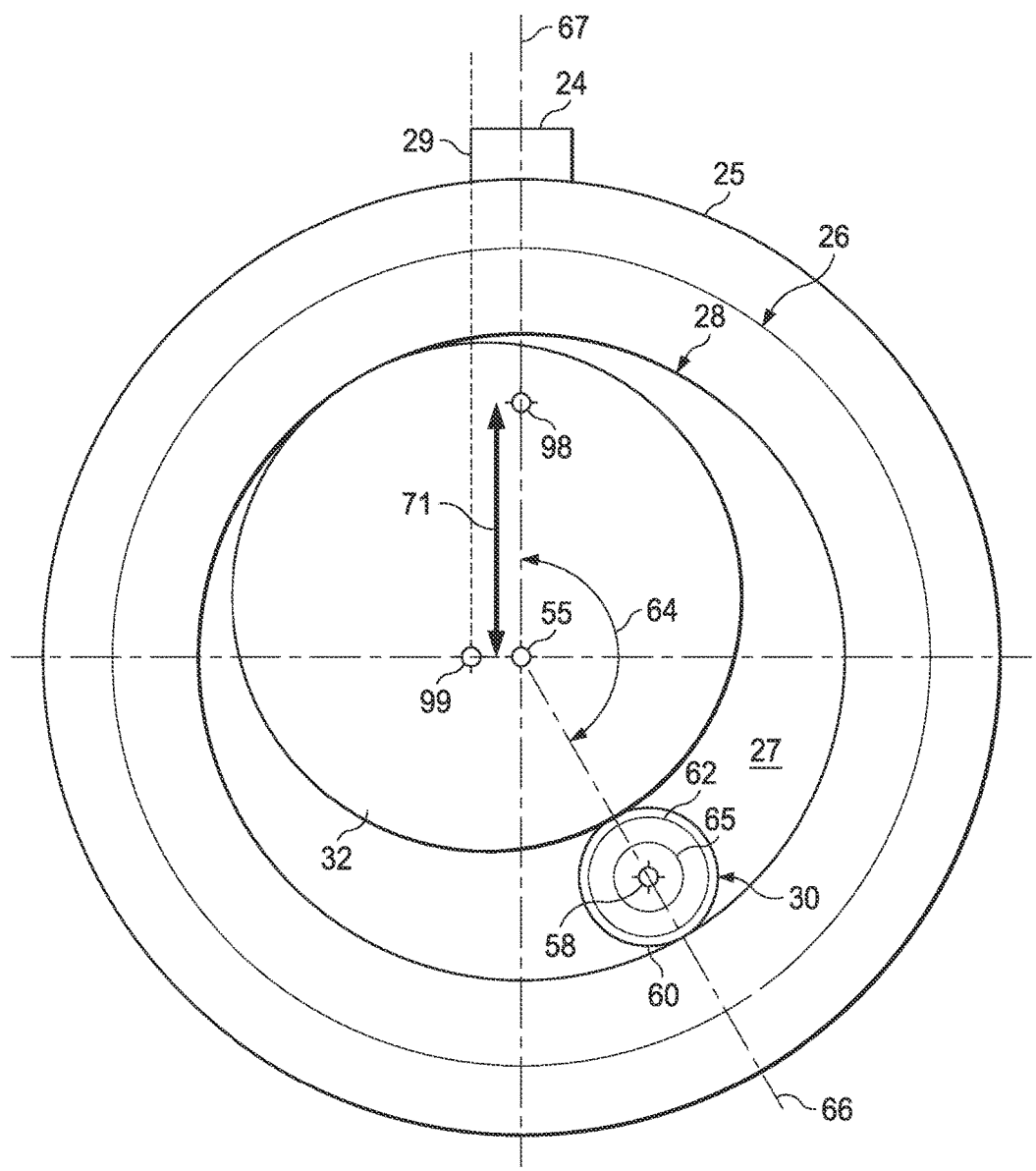
Figure 4B:
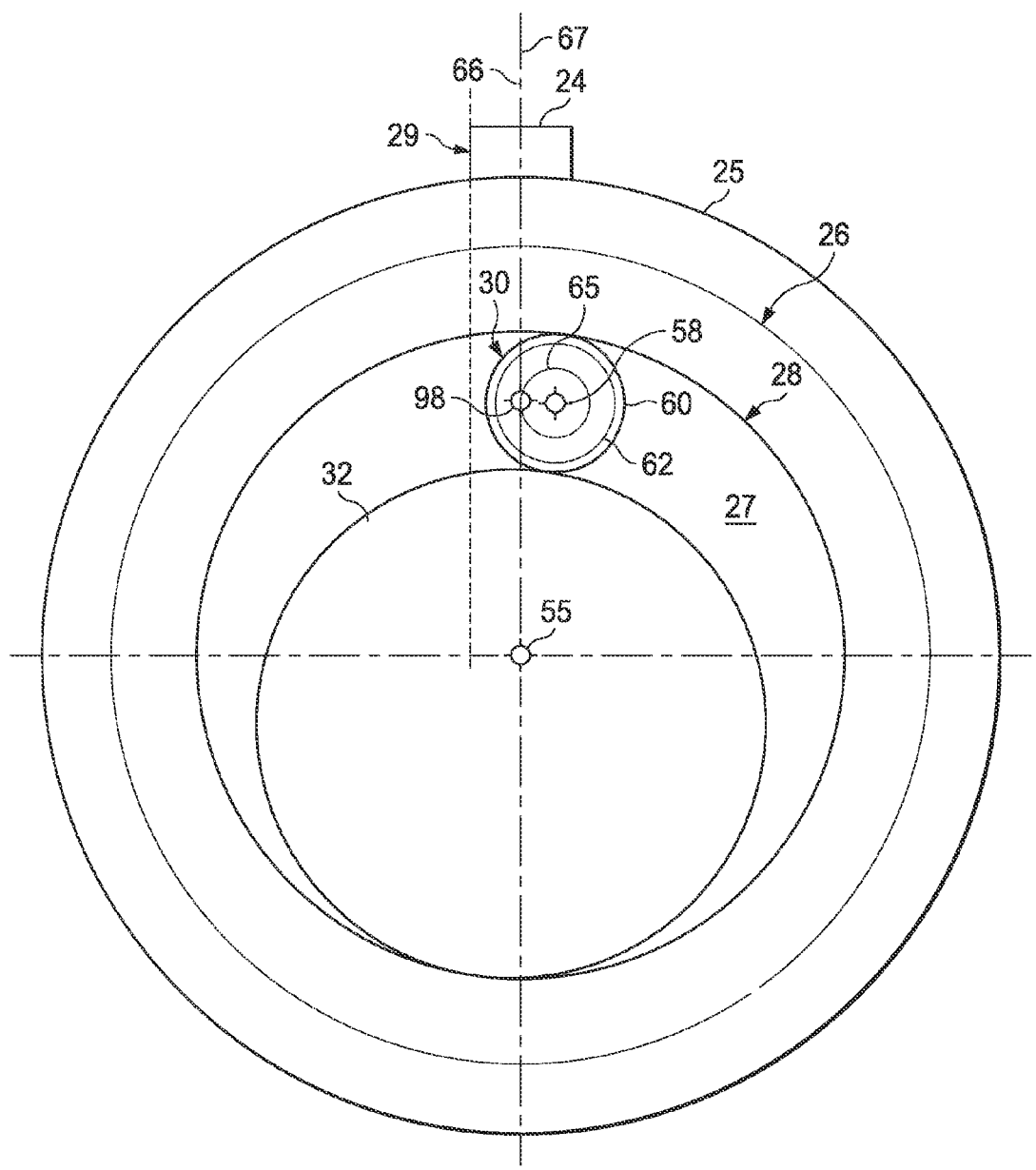

FIGS. 4A and 4B illustrate this example. In certain embodiments, a launch point of light may coincide with a point on diameter 65. Diameter 65 may have any value between zero and the maximum fiber core diameter 62 according to the design of the light system. In this example, the center of the hole of the ferrule 99 is not aligned with the receptacle center 55. After completing the edge mounting as shown in the figure, the fiber launch diameter 65 will be aligned with launch point 70. In certain cases, launch point 70 is fixed. Launch point 70 is separated by distance 71 from receptacle center 55 along the line 67. In certain embodiments, the location of point 70 is chosen to facilitate the alignment methods described herein.

Measurements may be made to determine the correction angle such that fiber launch diameter 65 meets launch point 70. The distance between fiber center 58 and receptacle center 55 may be measured. Angle 64 may be measured. The amount to rotate the ferrule such that fiber launch diameter 65 meets launch point 70 is a function of angle 64 and the measured distance. These values may be used to determine the rotation angle from a correction table. FIG. 4B shows the connector ferrule rotated to the correct position.

Figure 5:
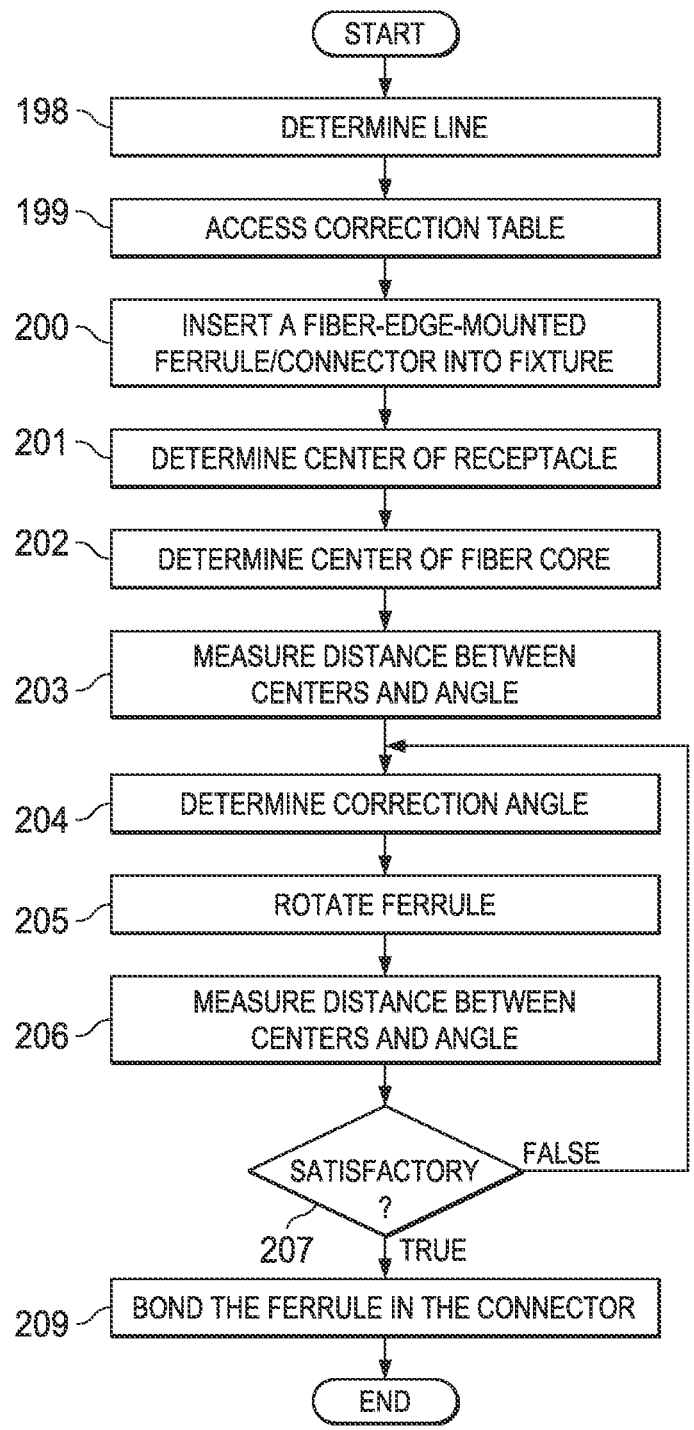
FIG. 5 illustrates a flow chart of an example of a method for aligning a connector.

FIG. 5 illustrates a flow chart of an example of a method for aligning a connector. The method starts at steps 198 and 199, where line 67 is determined and correction table is accessed. At step 200, a fiber-edge-mounted ferrule 26 is inserted into connector 10, which has an alignment key 24. Receptacle center 55 and fiber core center 58 are measured at steps 201 and 202, respectively. The distance between ferrule center 55 and fiber core center 58 and angle 64 between lines 66 and 67 are measured at step 203. The correction angle is determined at step 204. Ferrule 26 is rotated with respect to the connector 10 by the total calculated angle at step 205.

The distance between ferrule center 55 and fiber core center 58 and angle 64 between lines 66 and 67 are measured at step 206. Whether angle 64 is satisfactory is determined at step 207. For example, angle 64 is satisfactory if launch diameter 65 overlaps point 70. If angle 64 is not satisfactory, then the method returns to step 204 to perform the steps with the new measurements. If angle 64 is satisfactory, then the method proceeds to step 204 where ferrule 26 is bonded to the connector at step 209. The method then ends.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

Other modifications are possible without departing from the scope of the invention. For example, the description illustrates embodiments in particular practical applications, yet other applications will be apparent to those skilled in the art. In addition, future developments will occur in the arts discussed herein, and the disclosed systems, apparatuses, and methods will be utilized with such future developments.

The scope of the invention should not be determined with reference to the description. In accordance with patent statutes, the description explains and illustrates the principles and modes of operation of the invention using exemplary embodiments. The description enables others skilled in the art to utilize the systems, apparatuses, and methods in various embodiments and with various modifications, but should not be used to determine the scope of the invention.

The scope of the invention should be determined with reference to the claims and the full scope of equivalents to which the claims are entitled. All claims terms should be given their broadest reasonable constructions and their ordinary meanings as understood by those skilled in the art, unless an explicit indication to the contrary is made herein. For example, use of the singular articles such as "a," "the," etc. should be read to recite one or more of the indicated elements, unless a claim recites an explicit limitation to the contrary. As another example, "each" refers to each member of a set or each member of a subset of a set, where a set may include zero, one, or more than one element. In sum, the invention is capable of modification, and the scope of the invention should be determined, not with reference to the description, but with reference to the claims and their full scope of equivalents.

What is claimed is:

1. A method for aligning a ferrule within a connector, the method comprising:
   placing a fiber within the ferrule of the connector such that a fiber center of the fiber is a fiber distance away from a fixed ferrule point corresponding to a center of a receptacle configured to receive the connector, the connector having a fixed launch point corresponding to an angular position of a key on the connector;
   measuring the fiber distance between the fiber center and the fixed ferrule point;
   measuring an angular offset between the fixed launch point and the fiber center about the center of the ferrule;
   determining a rotation angle for the fiber distance and the angular offset from an angular correction table; and
   rotating the ferrule relative to the connector according to the rotation angle to align a launch diameter with the fixed launch point.

2. The method according to claim 1, the placing the fiber within the ferrule further comprising:
   disposing the fiber and an assisting fiber into an interior volume of the ferrule such that a portion of the assisting fiber is external to the ferrule, the assisting fiber comprising a material that expands when heated;
   heating at least a portion of the portion of the assisting fiber external to the ferrule to create an expanded portion of the assisting fiber; and
   moving the fiber and the assisting fiber with respect to the ferrule.

3. The method according to claim 1, further comprising generating the angular correction table using trial-and-error computer simulation and/or geometric equations.

4. The method according to claim 1, further comprising:
   receiving a selection of a launch diameter; and
   selecting the angular correction table or a portion of the angular correction table in response to the launch diameter.

* * * * *